United States Patent
Cohen

(10) Patent No.: US 8,341,131 B2
(45) Date of Patent: Dec. 25, 2012

(54) SYSTEMS AND METHODS FOR MASTER DATA MANAGEMENT USING RECORD AND FIELD BASED RULES

(75) Inventor: Ronen Cohen, Gasher Haziv (IL)

(73) Assignee: SAP AG, Walldorf (DE)

( * ) Notice: Subject to any disclaimer, the term of this patent is extended or adjusted under 35 U.S.C. 154(b) by 112 days.

(21) Appl. No.: 12/883,562

(22) Filed: Sep. 16, 2010

(65) Prior Publication Data

US 2012/0072464 A1 Mar. 22, 2012

(51) Int. Cl.
G06F 7/00 (2006.01)
G06F 17/00 (2006.01)

(52) U.S. Cl. .......................... 707/694; 707/803

(58) Field of Classification Search .............. 707/687, 707/690, 691, 694, 705, 759, 802, 953, E17.005, 707/E17.044, 803, E17.045; 714/48, 49, 714/100, E11.023
See application file for complete search history.

(56) References Cited

U.S. PATENT DOCUMENTS

| | | | |
|---|---|---|---|
| 5,664,109 A * | 9/1997 | Johnson et al. | 705/2 |
| 6,532,480 B1 * | 3/2003 | Boothby | 707/999.2 |
| 6,704,747 B1 * | 3/2004 | Fong | 707/999.1 |
| 6,721,751 B1 * | 4/2004 | Furusho | 707/752 |
| 7,013,315 B1 * | 3/2006 | Boothby | 707/999.203 |
| 7,310,646 B2 * | 12/2007 | Rangadass et al. | 707/999.1 |
| 7,739,309 B2 * | 6/2010 | Singh et al. | 707/802 |
| 8,065,266 B2 * | 11/2011 | Hoang et al. | 707/802 |
| 8,271,477 B2 * | 9/2012 | Sood et al. | 707/802 |
| 2002/0186254 A1 * | 12/2002 | Monbaron | 345/810 |
| 2003/0046280 A1 * | 3/2003 | Rotter et al. | 707/6 |
| 2004/0015783 A1 * | 1/2004 | Lennon et al. | 715/523 |
| 2004/0107189 A1 * | 6/2004 | Burdick et al. | 707/3 |
| 2004/0107203 A1 * | 6/2004 | Burdick et al. | 707/101 |
| 2004/0220955 A1 * | 11/2004 | McKee | 707/101 |
| 2006/0100912 A1 * | 5/2006 | Kumar et al. | 705/4 |
| 2006/0100919 A1 * | 5/2006 | Levine | 705/11 |
| 2006/0106832 A1 * | 5/2006 | Ben-Dyke et al. | 707/100 |
| 2006/0270419 A1 * | 11/2006 | Crowley et al. | 455/456.2 |
| 2008/0016074 A1 * | 1/2008 | Ben-dyke et al. | 707/7 |
| 2008/0046462 A1 * | 2/2008 | Kaufman et al. | 707/102 |
| 2008/0059412 A1 * | 3/2008 | Tarin | 707/2 |
| 2008/0275916 A1 * | 11/2008 | Bohannon | 707/200 |

(Continued)

OTHER PUBLICATIONS

Claude Pasquier (IBDC)—"Biological data integration using Semantic Web technologies"—Subjects: Quantitative Methods (q-bio.QM); Journal reference: Biochimie 90, 4 (2008) 584-94; arXiv.org > q-bio > arXiv:0902.3147—Feb. 18, 2009; (pp. 1-19).*

(Continued)

*Primary Examiner* — Anh Ly
(74) *Attorney, Agent, or Firm* — Buckley, Maschoff & Talwalker LLC

(57) ABSTRACT

According to some embodiments, a plurality of input records may be received from a plurality of sources, and each input record may include a plurality of fields. It may then be detected that a set of input records from different sources are related to each other (e.g., are duplicates). One of the set of input records may be automatically selected as a master record in accordance with a record level rule. At least one field in the master record may, according to some embodiments, be automatically modified based on a corresponding field in another input record in accordance with a field level rule. The modified master record could then be stored for subsequent use by other applications.

17 Claims, 8 Drawing Sheets

U.S. PATENT DOCUMENTS

| | | | |
|---|---|---|---|
| 2008/0307255 A1* | 12/2008 | Chen et al. | 714/13 |
| 2008/0319983 A1* | 12/2008 | Meadows | 707/5 |
| 2009/0024589 A1* | 1/2009 | Sood et al. | 707/3 |
| 2009/0164491 A1* | 6/2009 | Cotichini et al. | 707/101 |
| 2009/0234826 A1* | 9/2009 | Bidlack | 707/5 |
| 2010/0257092 A1* | 10/2010 | Einhorn | 705/38 |
| 2010/0274829 A1* | 10/2010 | Greer | 707/822 |
| 2012/0072464 A1* | 3/2012 | Cohen | 707/803 |

OTHER PUBLICATIONS

Christopher Re and Dan Suciu—"Approximate Lineage for Probabilistic Datab"—PVLDB '08, Aug. 23-28, 2008, Auckland, New Zealand; Copyright 2008 VLDB Endowment, ACM 978-1-60558-305-1/08/08—(Journal Proceedings of the VLDB Endowment VLDB Endowment Hompage archive)—vol. 1 Issue 1, Aug. 2008—(pp. 797-808).*

* cited by examiner

| KEY 402 | BUSINESS PARTNER 404 | LICENSE NUMBER 406 | POSTAL ADDRESS 408 | HEALTH CARE ORGANIZATION 410 | ROLE 412 | SOURCE SYSTEM 414 |
|---|---|---|---|---|---|---|
| 1 | Dr. Michael Schmidt | 9554692999 | 332 E. 63rd, New York 10021 USA | Methodist Hospital | Physician | SAP CRM |
| 2 | Michael A. Schmidt | 95546929 | 331 E. 63rd Street, NY 10021 | University, PA | Lecturer | SunGard |
| 3 | Dr. Micheal Schmidt | 9554469299 | 331 E. 63rd Street, NY 10021 | Children's Hospital | Investigator | Oracle Clinical |
| 4 | Mike Schmidt | 9554469299 | New York 10021 | Rush University | Speaker | Legacy Speaker System |
| 5 | Michael Schmidt | 9554469299 | NY, 10021 | Research Center | Advisor | Legacy Grants Mgmt |
| 6 | Michael Schmidt | 9554469299 | 331 E. 63rd Street Suite 1000, NY 10021 USA | Advertising Agency | Payer | SAP ERP |

*FIG. 4*

| SOURCE SYSTEM 502 | RELIABILITY SCORE 504 |
|---|---|
| SAP CRM | 1 |
| SIEBEL S&M | 2 |
| SunGard | 6 |
| Oracle Clinical | 5 |
| Legacy Speaker System | 7 |
| Legacy Grants Mgmt | 8 |
| SAP ERP | 3 |

| BUSINESS PARTNER 704 | LICENSE NUMBER 706 | POSTAL ADDRESS 708 | HEALTH CARE ORGANIZATION 710 | ROLE 712 | SOURCE SYSTEM (REMOTE KEY) 714 |
|---|---|---|---|---|---|
| Dr. Michael Schmidt | 955469299 | 331 E. 63rd Street Suite 1000, NY 10021 USA | Methodist Hospital | Physician | SAP CRM (1) |
| | | | University, PA | Lecturer | SunGard (2) |
| | | | Children's Hospital | Investigator | Oracle Clinical (3) |
| | | | Rush University | Speaker | Legacy Speaker System (4) |
| | | | Research Center | Advisor | Legacy Grants Mgmt (5) |
| | | | Advertising Agency | Payer | SAP ERP (6) |

SYSTEMS AND METHODS FOR MASTER DATA MANAGEMENT USING RECORD AND FIELD BASED RULES

FIELD

Some embodiments relate to master data management. More specifically, some embodiments provide systems and methods for master data management using record and field based rules.

BACKGROUND

A business or enterprise may store information about various items in the form of electronic records. For example, a company might have an employee database where each row in the database represents a record containing information about a particular employee (e.g., the employee's name, date of hire, and salary). Moreover, different electronic records may actually be related to a single item. For example, a human resources database and a sales representative database might both contain records about the same employee. In some cases, it may be desirable to consolidate multiple records to create a single data store that contains a single electronic record for each item represented in the database. Such a goal might be associated with, for example, a master data management program.

Currently, the consolidation process in a master data management program is a manual, time consuming, and error prone operation. For example, a person might manually review records looking for potential duplicates. When a potential duplicate is found, he or she might investigate to determine the best way for the information to be combined. Such an approach, however, may even be impractical when a substantial number of records and/or data stores are involved.

Accordingly, a method and mechanism for accurately handling and/or merging data records may be provided in accordance with some embodiments described herein.

BRIEF DESCRIPTION OF THE DRAWINGS

FIG. 4 illustrates a portion of an input record database according to some embodiments.

FIG. 5 illustrates a portion of a reliability score database in accordance with some embodiments.

FIG. 7 illustrates a portion of a master record database according to some embodiments.

DETAILED DESCRIPTION

Figure 1:
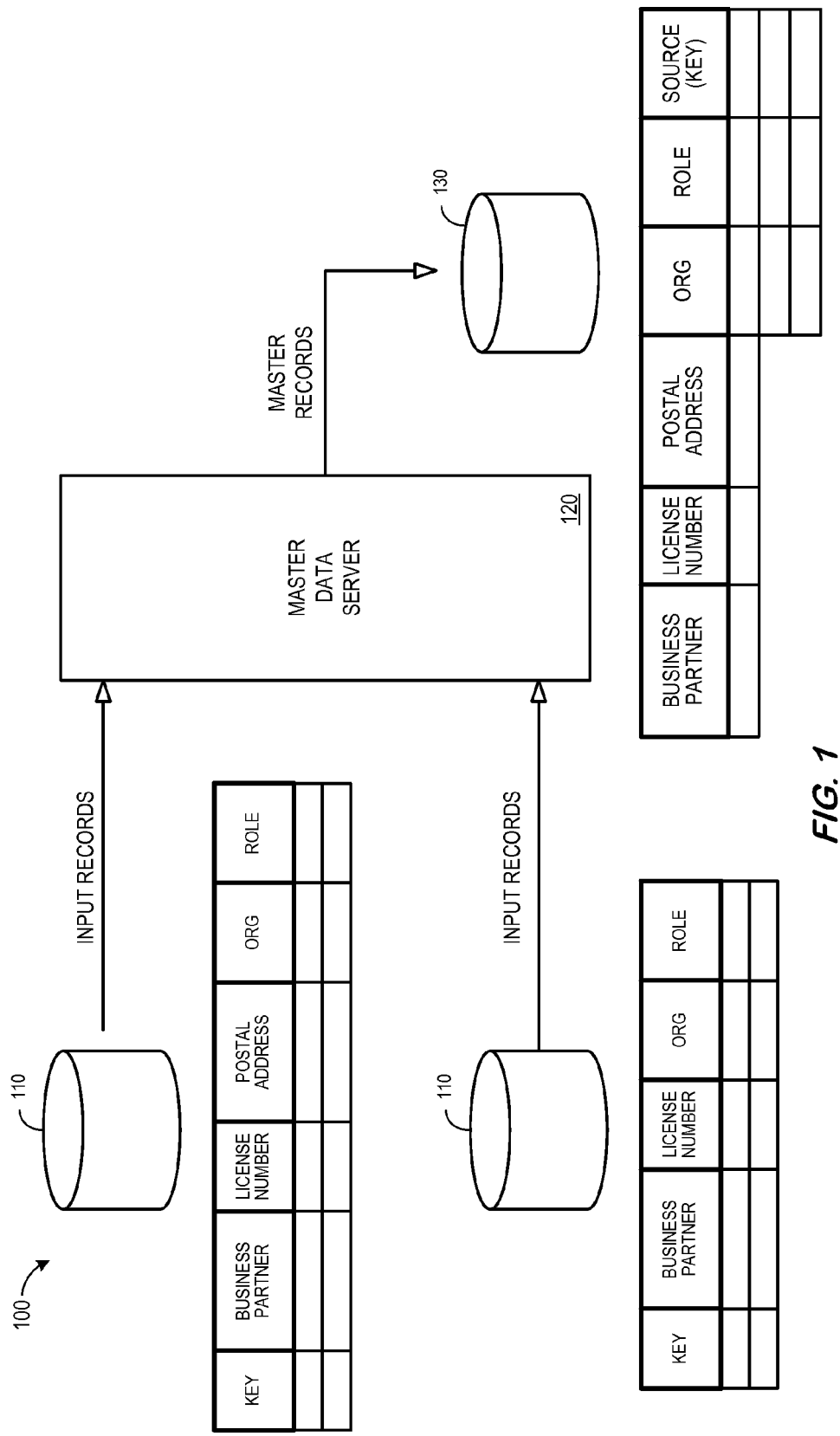
FIG. 1 is a block diagram of a system that might be associated with master data management according to some embodiments.

FIG. 1 is a block diagram of a system 100 that might be associated with master data management. The system 100 includes a number of data sources 110 storing records, each record containing a number of fields (e.g., a key number, business partner name, license number, and postal address). Different data sources 110 may, for example, be associated with different business applications, including legacy applications. According to some embodiments, one or more data sources might be associated with an Enterprise Resource Planning ("ERP") system. Note that the records might be stored within physical tables of a database. The database may comprise a relational database such as SAP MaxDB, Oracle, Microsoft SQL Server, IBM DB2, Teradata and the like. As another example, the data sources 110 might be associated with a multi-dimensional database, an eXtendable Markup Language ("XML") document, or any other structured data storage system. The physical tables may be distributed among several relational databases, dimensional databases, and/or other data sources.

A master data server 120 may receive input records from the various data sources 110. For example, the master data server 120 might import the input records from a remote data source 110 via HyperText Transport Protocol ("HTTP") communication or any other type of data exchange. The master data server 120 and/or data sources 110 might be associated with, for example, Personal Computers (PC), servers, and/or mobile devices.

The master data server 120 may consolidate and/or merge the input records received from the data sources 110 and store master records into a master database 130 in accordance with any of the embodiments described herein. For example, a human resources database and a sales representative database might both contain records about the same employee. In this case, the master data server 120 might automatically consolidate the multiple records to create a single master record for that employee. Such a goal might be associated with, for example, a master data management program.

According to some embodiments, a consolidation of records in master data management is associated with a two phase process of (i) identifying potential duplicates and then (ii) merging the records into a single best representing instance of the record. Note that large sets of data might be extracted from multiple legacy systems into the master data server 120 and include some obvious, straight forward duplicates that need to (and can be) resolved and merged immediately after the data is imported into the master data server 120. In many cases, the duplicate detection will be straight forward, such as when it is based on a well defined identifier that can't be interpreted in ambiguous ways. Examples of such identifiers include a Social Security Number for to identify individuals or a Global Trade Item Number ("GTIN") to detect duplicate materials.

In some cases, however, duplicate records may need to be merged into a single physical record, but conflicting data values exist among the different records. For example, one record might indicate a home address of "123 Main Street" while another record indicates a home address of "12 Main Street." According to some embodiments described herein, a rule based mechanism may facilitate consolidation in any conflict situation. Moreover, this logic may comprise a set of rules that automate and streamline the consolidation process in master data management.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
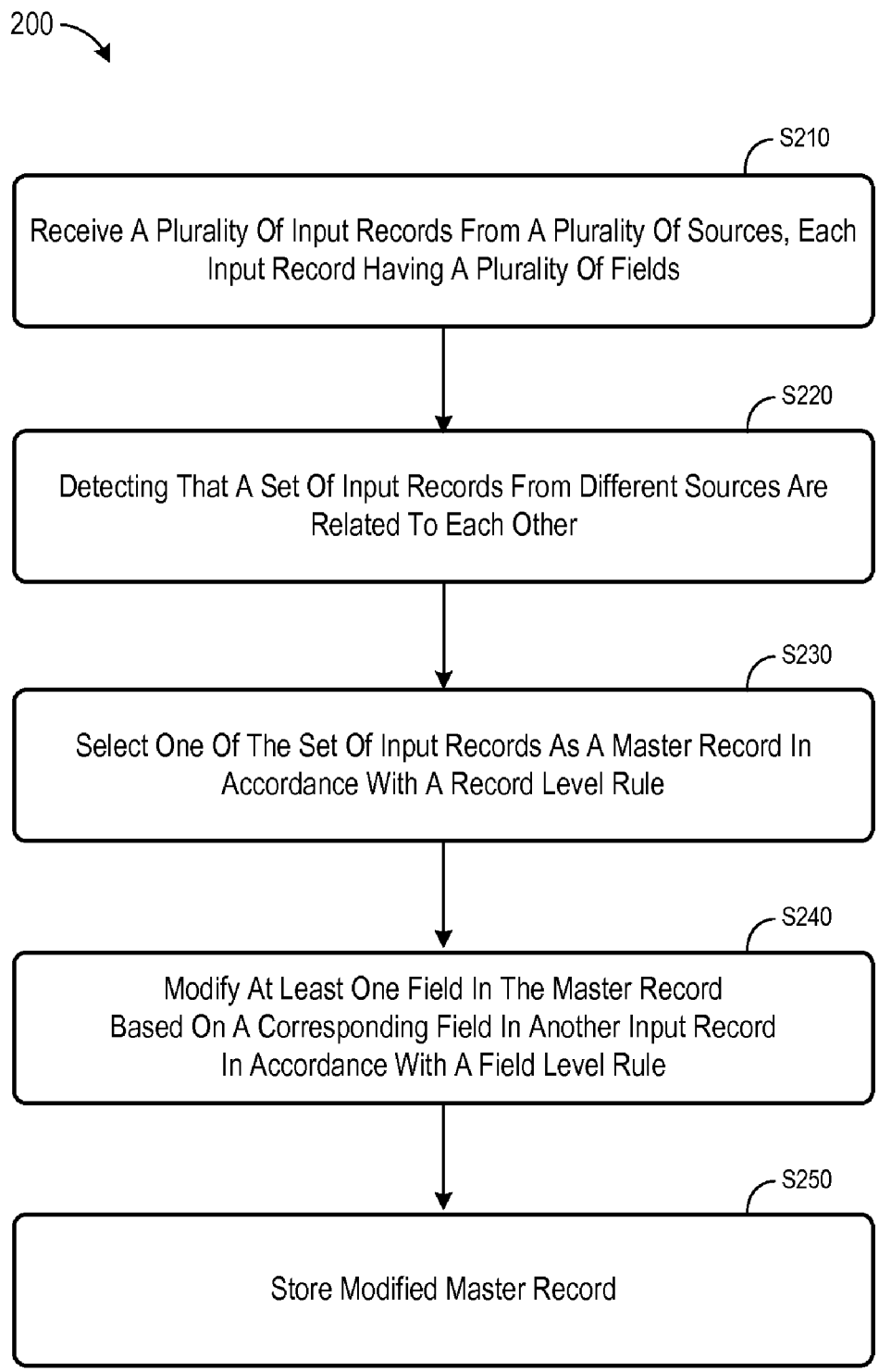
FIG. 2 is a flow diagram of a process in accordance with some embodiments.

The master data server 120 may operate in accordance with any of the embodiments described herein. For example, FIG. 2 is a flow diagram of a process 200 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a plurality of input records may be received from a plurality of sources, each input record including a plurality of fields. It may then be detected at S220 that a set of input records from different sources are related to each other. For example, similar values in corresponding fields off the input records may be found.

At S230, one of the set of input records may be automatically selected as a master record in accordance with a record level rule. For example, source might be associated with a reliability score and the record level rule might automatically select the input record from the source having the best reliability score. As other example, the record level rule might be associated with a completeness criteria, an occurrence frequency associated with combinations of values across fields, and/or when each record was created or modified.

At S240, at least one field in the master record may be automatically modified based on a corresponding field in another input record in accordance with a field level rule. The field level rule might be associated with, for example, a value length, a value frequency of corresponding fields in different input records, a record or field reliability score, and/or when the field was created or modified. According to some embodiments, a field in the master record is automatically modified based on values in a plurality of corresponding fields in other input records in accordance with a minimum function, a maximum function, and/or an average function. Moreover, in some cases a value might be placed into a field of the master record based on a value in a non-corresponding field and/or data received from a third party service.

At S250, the modified master record may be stored. For example, the modified mast record might be stored in a master database. In some embodiments, a field from another input record might be appended to the master record without deleting the value of the corresponding field in the master record. Such an approach may, for example, let an operate "undo" a consolidation and/or investigate the lineage of information in the master database.

According to some embodiments, at least one of a record level rule or field level rule is automatically adjusted based on historical information. For example, it might be determined that a field level rule has, in the past, not improved the quality of data in the master database and a different approach or threshold might be automatically selected or adjusted.

Figure 3:
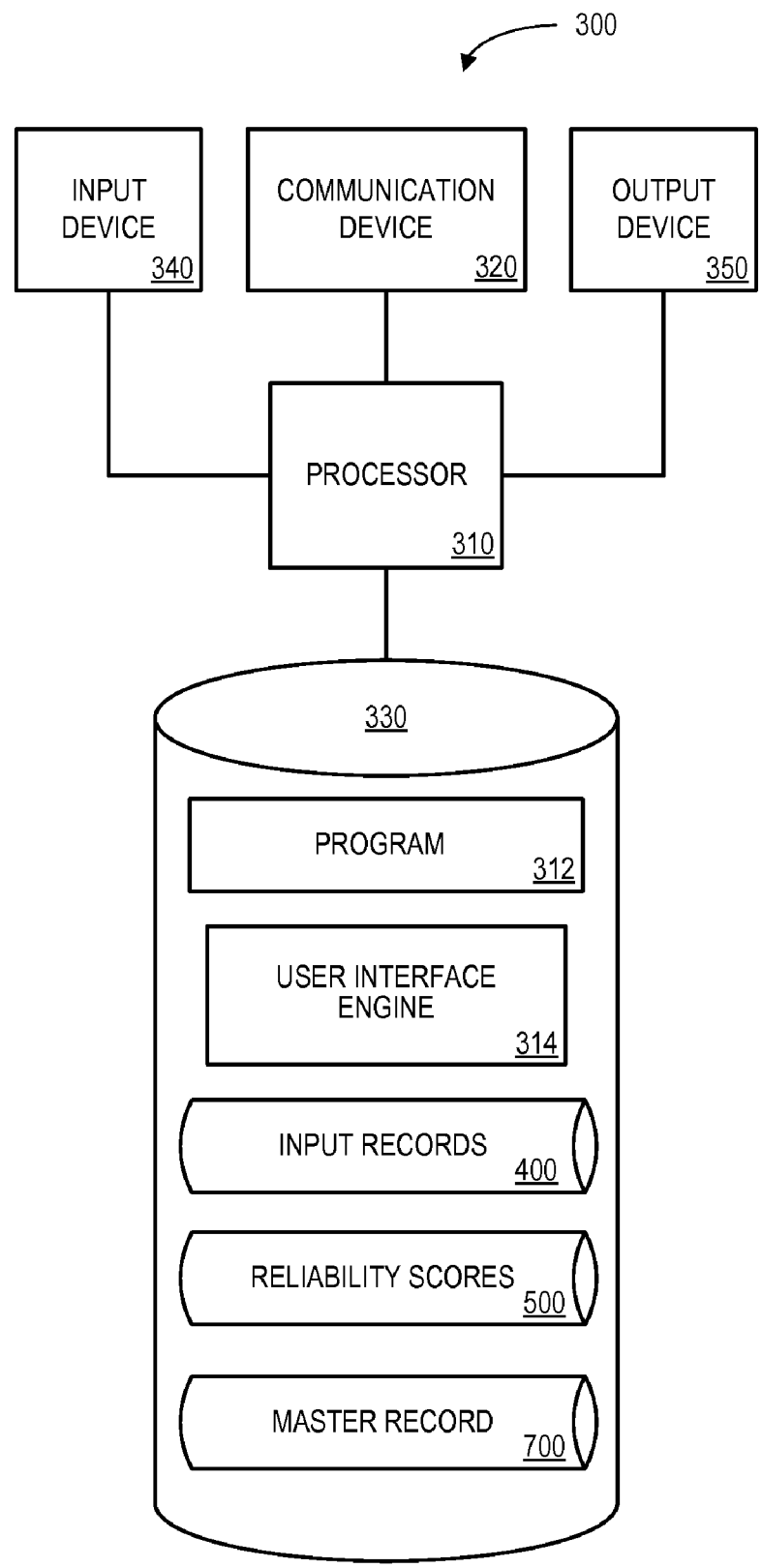
FIG. 3 is a block diagram of a master data management platform according to some embodiments.

FIG. 3 is a block diagram overview of a master data server platform 300 according to some embodiments. The master data server platform 300 may be, for example, associated with any of the devices described herein. The master data server platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more remote data sources, master databases, and/or operators. The master data server platform engine 300 further includes an input device 340 (e.g., a mouse and/or keyboard to enter record or field level rules) and an output device 350 (e.g., a computer monitor to display a user interface element and/or master data reports).

The processor 310 communicates with a storage device 330. The storage device 330 may comprise any appropriate information storage device, including combinations of magnetic storage devices (e.g., a hard disk drive), optical storage devices, and/or semiconductor memory devices. The storage device 330 stores a program 312 and/or user interface engine application 314 for controlling the processor 310. The processor 310 performs instructions of the programs 312, 314, and thereby operates in accordance with any of the embodiments described herein. For example, the processor 310 may receive a plurality of input records from a plurality of sources, each input record including a plurality of fields. The processor 310 may then detect that a set of input records from different sources are related to each other. One of the set of input records may be automatically selected by the processor 310 as a master record in accordance with a record level rule. The processor 310 may then automatically modify at least one field in the master record based on a corresponding field in another input record in accordance with a field level rule. The modified master record may then be stored and/or transmitted by the processor 310.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the master data server platform 300 from another device; or (ii) a software application or module within the master data server platform 300 from another software application, module, or any other source.

In some embodiments (such as shown in FIG. 3), the storage device 330 stores an input records database 400 containing records received from data sources, a reliability score database 500 (described with respect to FIG. 5), and a master record database 700 (described with respect to FIG. 7). One example of a database 400 that may be used in connection with the master data server platform 300 will now be described in detail with respect to FIG. 4. Note that the databases described herein are examples, and additional and/or different information may be stored therein. Moreover, various databases might be split or combined in accordance with any of the embodiments described herein.

Referring to FIG. 4, a table is shown that represents the input records database 400 that may be stored at the master data server platform 300 according to some embodiments. The table may include, for example, entries identifying potential duplicate records that may need to be combined and/or merged. The table may also define fields 402, 404, 406, 408, 410, 412, 414 for each of the entries. The fields 402, 404, 406, 408, 410, 412, 414 may, according to some embodiments, specify: a key 402, a business partner name 404, a license number 406, a postal address 408, a health care organization 410, a role 412, and/or a source system 414. The information in the input records database 400 may be created and updated, for example, based on information received from data sources (including in some cases legacy data sources).

The key 402 may be, for example, an alphanumeric code associated with the input record. The business partner name 404 might represent an entity associated with the record. Note that the business partner names 404 for different records might exhibit slight variations (e.g., informal differences such as "Dr." as compared to "Doctor" and/or errors such as typographical errors). The license number 406 may be a number associated with the records, and the postal address 408 may represent the mailing address of the entity. The health care organization 410 might represent another party associated with the record and the role 412 might indicate a type of relationship between the parties. The source system 414 might be associated with where the data originated.

The information illustrated in FIG. 4 includes six records associated with a single entity. According to some embodiments, a master data program may seek to automatically consolidate those six records in an accurate manner. One approach to this problem may be to consider the reliability of various source systems 414. For example, referring to FIG. 5, a table is shown that represents the reliability score database 500 that may be stored at the master data server platform 300 according to some embodiments. The table may include, for example, entries associated with each potential source of an input record. The table may also define fields 502, 504 for each of the entries. The fields 502, 504 may, according to some embodiments, specify: a source system 502 and a reliability score 504. The information in the reliability score database 500 may be created and updated, for example, based on how accurate past information was from each of the sources.

The source system 502 may be, for example, an alphanumeric code associated with a data source and may be identical, to or associated with, the source system 414 field in the input record database 400. The reliability score 504 might, for example, be a ranking indicating how reliable the source system 502 is as compared to other source systems 502 (with "1" being the most accurate). As another example, the reliability score 504 might represent a weighing value or an accuracy percentage associated with the source system 402.

Figure 6:
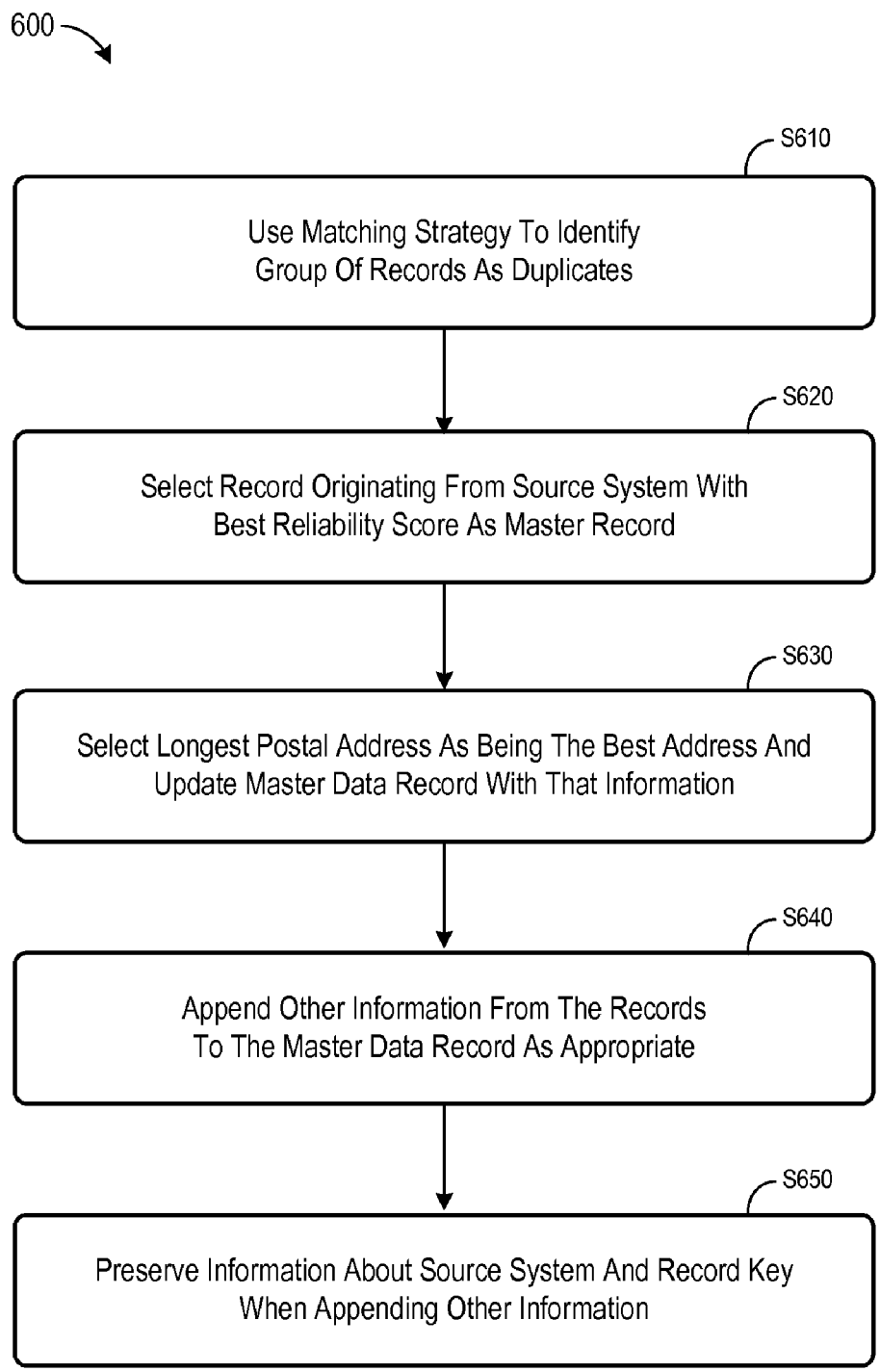
FIG. 6 is a flow diagram of a process according to one embodiment that might be implemented.

The information in the reliability scores database 500 may be used to select one of the records in the input record database 400 as a "master" record. Consider, for example, FIG. 6 which is a flow diagram of a process 600 according to some embodiments.

At S610, a matching strategy may identify a group of records as duplicates. For example, a plurality of input records may be received from a plurality of sources, each input record including a plurality of fields. It may then be detected at that a set of input records from different sources are related to each other. For example, similar license numbers 406 may be identified to and those records may be stored in the input records database 400. According to some embodiments, potential duplicate records are scored and only those records with a score equal to or higher than a threshold will be automatically merged (e.g., others might flagged for manual review by a system operator).

One of the records identified in S610 is then selected as a "master" record using a record-level rule. For example, the record originating from the source system with the best reliability score 504 may be selected as the master record at S620. In the example of FIGS. 4 and 5, "SAP CRM" had the best reliability score 504 (rank of "1") and the electronic record from that source (with a key 402 of "1") is selected as the master record. FIG. 7 illustrates a master record database 700 built using such strategy and the business partner name 704 and license number 706 may be copied from the first record of the input record database 400.

The selected master data record may be modified in accordance with a field level rule. For example, at S630 the longest postal address 408 in the input records database 400 is selected as being the best address and the master record is updated accordingly. Referring to FIG. 4, the last record contains the longest postal address 408 (that is, the most alphanumeric characters), and is therefore stored in the postal address 708 field of the master record database 700. Note that if no field level rule applies to a particular field, that field may just receive the original value from the master record (e.g., the incorrect license number 406 in the second record of FIG. 4 is not placed in the master record database 700).

Other information from the records may be appended to the master data record as appropriate at S640. For example, the doctor of FIG. 4 serves different roles 412 in connection with different health care organizations 410 and each tuple of information is copied into the role 712 and health care organization 710 fields in the master record database 700. Finally, the master record database 700 may store information about the source system 414 and record key 402 in the source system (remote key) field 714 to preserve such information (e.g., for later review or undoing) at S650.

Thus, some embodiments may provide a single, up-to-date and accurate representation of Dr. Michael Schmidt within a master data management hub that can be shared across an information technology landscape with analytical as well as operational systems. In the consolidation process of FIG. 6, a group of identified duplicate records were evaluated using a record level rule (reliability score 504) to select one master or "golden" record. Next, a field level rule (length of postal address 408) was used to modify the golden record. These particular record and field level rules are simply examples, and many other types of criteria could be used instead.

For example, record and/or field level rules might be associated with completeness. With respect to record level consolidation, the record with the highest number of populated fields might be selected as the master record. With respect to field level consolidation, the fields with the longest values might be selected to over-ride the values in the selected master data record.

As another example, record and/or field level rules might be associated with frequency. For example, the record that has the most frequently occurring combination of values across fields (e.g., pairs of fields) might be selected as the master record. Similarly, the most frequently occurring value could be selected as a field level rule.

As still another example, record and/or field level rules might be associated with how recently data was updated. The most recently updated record might be selected as a master data record while the most recently updated field might be selected by a field level rule.

Further, record and/or field level rules might be associated with source reliability. That is, the record that originated in a preferred source system might be selected as a master data record. Note that at the field level different sources might be preferred for different fields.

Note that survivorship rules may part of the matching strategy definition, and a system might support selection criteria in the granularity described herein. In a mixed strategy situation, the record level survivorship rules may be applied first and then the field level rules are applied. In some embodiments, a single record level consolidation rule is used while multiple field level rules are applied in a given merge case.

Figure 8:
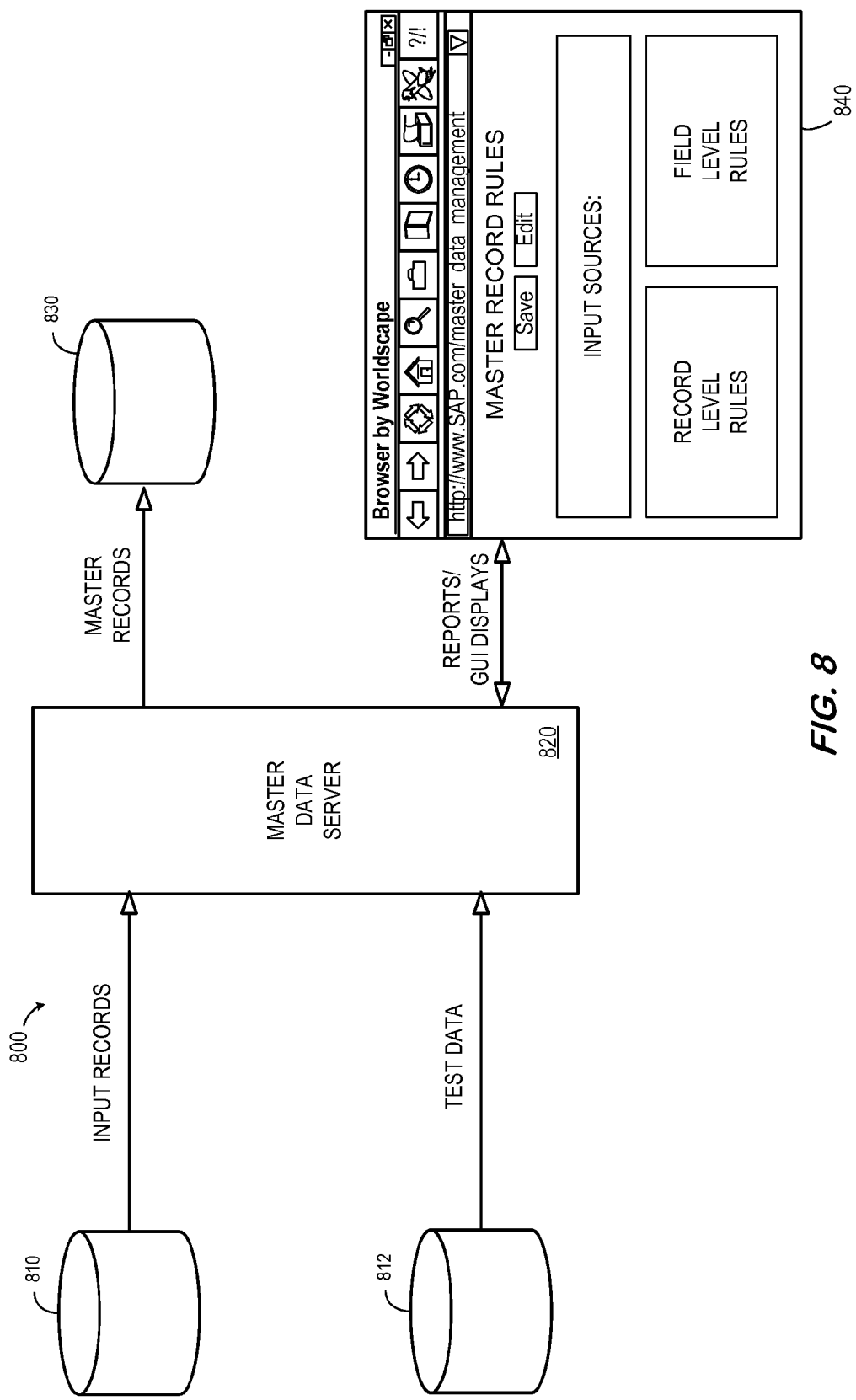
FIG. 8 is a block diagram of a system that might be associated with master data management according to another embodiment.

In order to facilitate the accuracy and completeness of merge results, a simulation mode may be provided to show the rule that was applied for each field and how the rule determined each value in a master record. For example, FIG. 8 is a block diagram of a system 800 that might be associated with master data management. The system 800 includes a data sources 810 storing records, each record containing a number of fields (e.g., a key number, business partner name, license number, and postal address). A master data server 820 may receive input records from the data source 810. The master data server 820 may consolidate and/or merge the input records received from the data source 810 and store master records into a master database 830 in accordance with any of the embodiments described herein.

According to this embodiment, the master data server 820 can also receive test data from a test source 812 during a simulation mode. The test data may be used, for example, to detect why certain fields in the master database 830 are empty or incorrect (e.g., because they were empty in the first place or because a field level rule deleted the output of a previous rule). Moreover, a graphic user interface 840 may be used to provide simulation and actual data to an operator (e.g., a master record lineage report) and/or to receive record and field level rules and rule adjustments from the operator. Note that when defining rules, it may be possible to indicate whether the rule will accumulate values or chose the best value based on the consolidation criteria. In this case, an accumulation of values might only be available with respect to multi-valued fields. According to some embodiments, survivorship rules consider pre-defined constraints that must be fulfilled. For example, a merged record address should not be empty, and if it turns out that the address is empty the group of duplicate records might not be merged and are instead put into an exception bucket for review by an operator.

In other cases, it may be possible to define rules that set value based on other field's values (e.g., if a gender field is empty and a title field equals "Mr." then set the gender field of the resulting merged record to "Male"). That is, the master data program may enrich the merged record and create an improved record representation.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of data, note that embodiments may be associated with other types of information. For example, sales orders, financial information, and health data may be processed in accordance with any of the embodiments described herein.

Moreover, while embodiments have been illustrated using particular series of steps, embodiments may be implemented in any other of a number of different ways. For example, a first set of field level rules might be applied, followed by a record level selection of a master record (and potentially then other field level rules might be applied to the master record).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
    receiving a plurality of input records from a plurality of sources, each input record including a plurality of relational database fields;
    detecting that a set of input records from different sources are related to each other;
    automatically selecting one of the set of input records as a master record in accordance with a record level rule;
    automatically modifying at least one relational database field in the master record based on a corresponding relational database field in another input record in accordance with a field level rule;
    appending a relational database field from another input record to the master record without deleting the value of the corresponding relational database field that is related to the appended relational database field in the master record;
    storing the modified master record;
    receiving an undo indication from a user; and
    responsive to the undo indication, restoring the master record to the unmodified state based on the appended relational database field, wherein each source is associated with a reliability score and the record level rule comprises automatically selecting the input record from the source having the best reliability score.

2. The method of claim 1, wherein the record level rule is associated with at least one of: (i) a completeness criteria, (ii) an occurrence frequency associated with combinations of values across relational database fields, or (iii) when the record was created or modified.

3. The method of claim 1, wherein said detecting that the set of input records are related to each other comprises finding similar values in corresponding relational database fields of the input records.

4. The method of claim 1, wherein the field level rule is associated with at least one of: (i) a value length, (ii) a value frequency of corresponding fields in different input records, (iii) a record or field reliability score, or (iv) when the relational database field was created or modified.

5. The method of claim 1, wherein a field in the master record is automatically modified based on values in a plurality of corresponding fields in other input records in accordance with: (i) a minimum function, (ii) a maximum function, or (iii) an average function.

6. The method of claim 1, further comprising:
    storing an indication of the other input record along with the modification to the relational database field of the master record.

7. The method of claim 6, further comprising:
    generating a master record lineage report based at least in part on the stored indication.

8. The method of claim 1, wherein the input records comprise simulation records.

9. The method of claim 1, wherein at least one of a record level rule or field level rule is automatically adjusted based on historical information.

10. The method of claim 1, further comprising:
    transmitting an exception associated with at least one of a record or a relational database field indicating that manual review is recommended.

11. The method of claim 1, further comprising:
placing a value into a relational database field of the master record based on at least one of: (i) a value in a non-corresponding relational database field, or (ii) data received from a third party service.

12. A non-transitory, computer-readable storage medium storing program code executable by a computer to:
receive a plurality of input records from a plurality of sources, each source being associated with a reliability score and each input record including a plurality of relational database fields;
detect that a set of input records from different sources are related to each other by finding similar values in corresponding relational database fields of the input records;
automatically select the input record from the source having the best reliability score as a master record in accordance with a record level rule;
automatically modify at least one relational database field in the master record based on a corresponding relational database field in another input record in accordance with a field level rule; appending a relational database field from another input record to the master record without deleting the value of the corresponding relational database field that is related to the appended relational database field in the master record;
store the modified master record;
receive an undo indication from a user; and
responsive to the undo indication, restore the master record to the unmodified state based on the appended relational database field, wherein each source is associated with a reliability score and the record level rule comprises automatically selecting the input record from the source having the best reliability score.

13. The medium of claim 12, wherein a plurality of field level rules are applied to modify the master record.

14. The medium of claim 12, wherein the field level rule is associated with at least one of: (i) the source reliability scores or a field level reliability score, (ii) a completeness criteria, (iii) an occurrence frequency, or (iv) when information was created or modified.

15. A system, comprising:
an input data store to provide a plurality of input records associated with different sources, each input record including a plurality of relational database fields;
a master record data store; and
a master data server to (i) receive the input records from the input data store and (ii) store a modified master record into the master record store, wherein the master data server:
detects that a set of input records from different sources are related to each other,
selects one of the set of input records as a master record in accordance with a record level rule,
creates the modified master record by modifying at least one relational database field in the master record based on a corresponding relational database field in another input record in accordance with a field level rule and appending a relational database field from another input record to the master record without deleting the value of the corresponding relational database field that is related to the appended relational database field in the master record;
receives an undo indication from a user; and
responsive to the undo indication, restores the master record to the unmodified state based on the appended relational database field, wherein each source is associated with a reliability score and the record level rule comprises automatically selecting the input record from the source having the best reliability score.

16. The system of claim 15, wherein the master data server is further to store an indication of the other input record along with the modification to the relational database field of the master record.

17. The system of claim 15, wherein at least one of the record or field level rule are associated with at least one of: (i) a reliability score, (ii) a completeness criteria, (iii) an occurrence frequency, or (iv) when information was created or modified.

* * * * *